United States Patent [19]

Pradal

[11] 4,110,692
[45] Aug. 29, 1978

[54] AUDIO SIGNAL PROCESSOR

[75] Inventor: Bortolo Mario Pradal, Pittsburgh, Pa.

[73] Assignee: RCA Corporation, New York, N.Y.

[21] Appl. No.: 741,404

[22] Filed: Nov. 12, 1976

[51] Int. Cl.² .............................................. H04B 1/66
[52] U.S. Cl. ..................................... 325/147; 325/46; 328/167; 330/109; 307/237
[58] Field of Search .................. 325/46, 147, 45, 145; 332/18; 330/96, 106, 135, 136, 82, 98, 109; 307/230, 237, 264; 328/167

[56] References Cited

U.S. PATENT DOCUMENTS

| | | | |
|---|---|---|---|
| 3,109,991 | 11/1963 | Ocko | 325/46 |
| 3,626,331 | 12/1971 | Burns | 325/147 |
| 3,876,939 | 4/1975 | Lerner | 325/46 |
| 3,886,469 | 5/1975 | Rollett et al. | 328/167 |
| 3,904,978 | 9/1975 | Daniels | 328/167 |
| 3,986,049 | 10/1976 | Campell et al. | 307/237 |
| 3,999,137 | 12/1976 | Fucito | 328/167 |

OTHER PUBLICATIONS

Textbook by Geffe, "Simplified Modern Filter Design", p. 140, 1963.
Textbook by Huelsman, "Active Filters: Lumped, Distributed, Integrated, Digital and Parametric", pp. 106–126, 1970.

Primary Examiner—Robert L. Griffin
Assistant Examiner—Jin F. Ng
Attorney, Agent, or Firm—Eugene M. Whitacre; Paul J. Rasmussen; Robert L. Troike

[57] ABSTRACT

An audio processor for use in an angular modulation transmitter for performing pre-emphasizing, limiting, and low pass filtering functions. Novel pre-emphasis, limiter and low pass filter stages are disclosed.

6 Claims, 5 Drawing Figures

AUDIO SIGNAL PROCESSOR

The present invention is directed to an audio signal processor that processes an audio signal for radio transmission and, in particular, to an audio signal processor for preceding phase or frequency modulators.

An audio processor is a circuit which performs pre-emphasizing, limiting and filtering functions on the audio signal before the signal is applied to the modulator. This is done to improve the signal-to-noise ratio in the system and, at the same time, avoid overmodulation conditions that generate undesired out-of-band transmission. The present invention is directed to an audio processor providing improved performance in these regards.

In frequency modulation transmitters the frequency of the transmitted signal is varied from a nominal carrier (center) frequency by an amount proportional to the instantaneous peak amplitude ($V_a$) of an audio input signal. The amount of variance from the center frequency is termed the "frequency deviation" ($\Delta F$) of the FM signal. The ratio of the amount of frequency deviation to the amplitude of the audio input signal $\Delta F/V_a$ is termed the "sensitivity" of the modulator. The frequency deviation from the center frequency occurs at a rate equal to the frequency of the audio input signal.

In many applications, an FM modulator must be capable of operating on input signals, such as human speech or music, which vary over a considerable range of amplitudes and frequencies. For example, mobile radios are required to operate over the range of amplitudes of human speech for frequencies between 300 and 3000 Hz. The maximum frequency deviation ($\Delta F$ max) allowable in a given FM system is prescribed by Governmental regulations. For example, the North American standard for mobile radio is 5 kHz maximum frequency deviation. It is essential that the maximum frequency deviation of a channel not be exceeded in a multichannel environment so as to avoid objectionable interference with other channels. However, the signal to noise ratio of an FM signal, and hence the efficiency of the FM system, is directly proportional to the magnitude of the maximum frequency deviation of the signal. Thus, it is desirable to utilize as high a percentage as possible of the frequency deviation allocated for a particular channel without "overmodulating", that is, without deviating beyond the prescribed limit.

Figure 1:
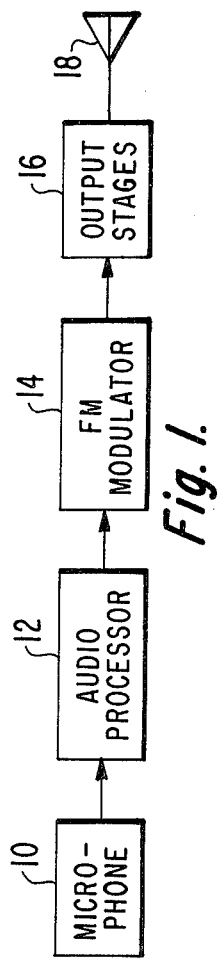
FIG. 1 is a block diagram of a typical FM transmitter.

To this end an "audio signal processor" circuit is commonly interposed between the audio signal source and the FM modulator. For example, as illustrated in FIG. 1, in a typical FM transmitter, a microphone 10 is coupled through an audio processor 12 to an FM modulator 14. The output signals of the FM modulator are applied through amplifying, frequency-multiplying output stages, generally indicated as 16, to a transmitting antenna 18. Audio signal processors typically provide a pre-emphasis network to improve the noise characteristic of the transmitter, a signal amplitude clipper or limiter, to maintain the amplitude of the audio-modulating signals applied to the modulator below a predetermined value and a low pass filter to attenuate spurious out of band signals produced by the limiting or clipping. As will be explained, the relative amplitudes of the frequency components of the audio processor output signal applied to the FM modulator, depend in part upon the frequency of the audio input signal. Accordingly, the deviation of the modulated signal also becomes, in effect, dependent on the frequency as well as the amplitude of the audio input signal.

In general, the sensitivity of the modulator is adjusted such that an audio input signal of a predetermined standard reference frequency having an amplitude above the limiting or clipping level generates a "high percentage" frequency deviation. In practice, the standard reference frequency and a specific procedure for adjusting the modulator sensitivity is prescribed by industry standard, for example, set by Electronic Industries Association (EIA). Pursuant to the standards applicable to mobile radios (EIA RS-152-B) the audio input signal is set at a standard reference frequency of 1000 Hz, the geometric mean of the 300 Hz — 3 kHz audio band, at an amplitude calculated to generate a frequency deviation in the FM output signal equal to 60% of the maximum deviation (5 kHz). The audio input amplitude is then increased by 20 db, within a predetermined period, raising the input amplitude far beyond the clipping level for all frequencies within the audio band, and the instantaneous peak and steady state deviations are observed.

A "limiting characteristic" response for the modulation system is determined pursuant to the EIA standard by maintaining the input amplitude at the 20 db level, such that clipping occurs at all frequencies within the prescribed 300 Hz — 3 kHz audio band, and observing the frequency deviation for all frequencies in the audio band. Since the frequency deviation of modulator 14 is directly proportional to the amplitude of the signal applied to the modulator, the limiting characteristic response of the FM system will hereinafter be referred to as the "limiting characteristic response" of audio processor 12.

Figure 2:
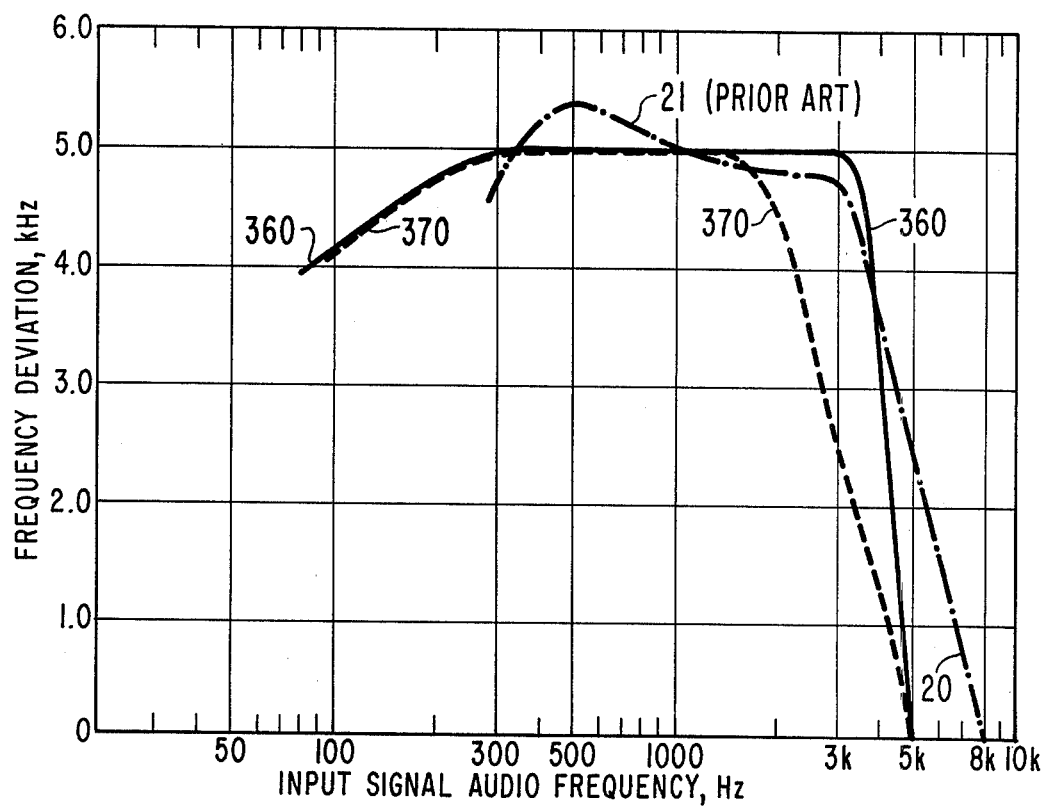
FIG. 2 is a graph comparing the limiting characteristic responses of a prior art audio processor in accordance with the present invention.

FIG. 2 depicts a typical prior art limiting characteristic 21. FIG. 2 shows that in such a prior art system, if the maximum deviation of the system at the 1 kHz reference frequency is set for the maximum allocated frequency deviation (5 kHz), audio input signals at the 20 db limiting level having frequencies in the 350 to 1,000 Hz range would cause overmodulation. Accordingly, the prior art systems utilize modulators with sensitivities such that the maximum frequency deviation at the 1 kHz standard is in the range of 4500 to 4700 Hz to avoid thereby overmodulation at the lower frequency input signals. Thus, the prior art systems are typically unable to make the most effective use of the allocated channel bandwidth.

Figure 3:
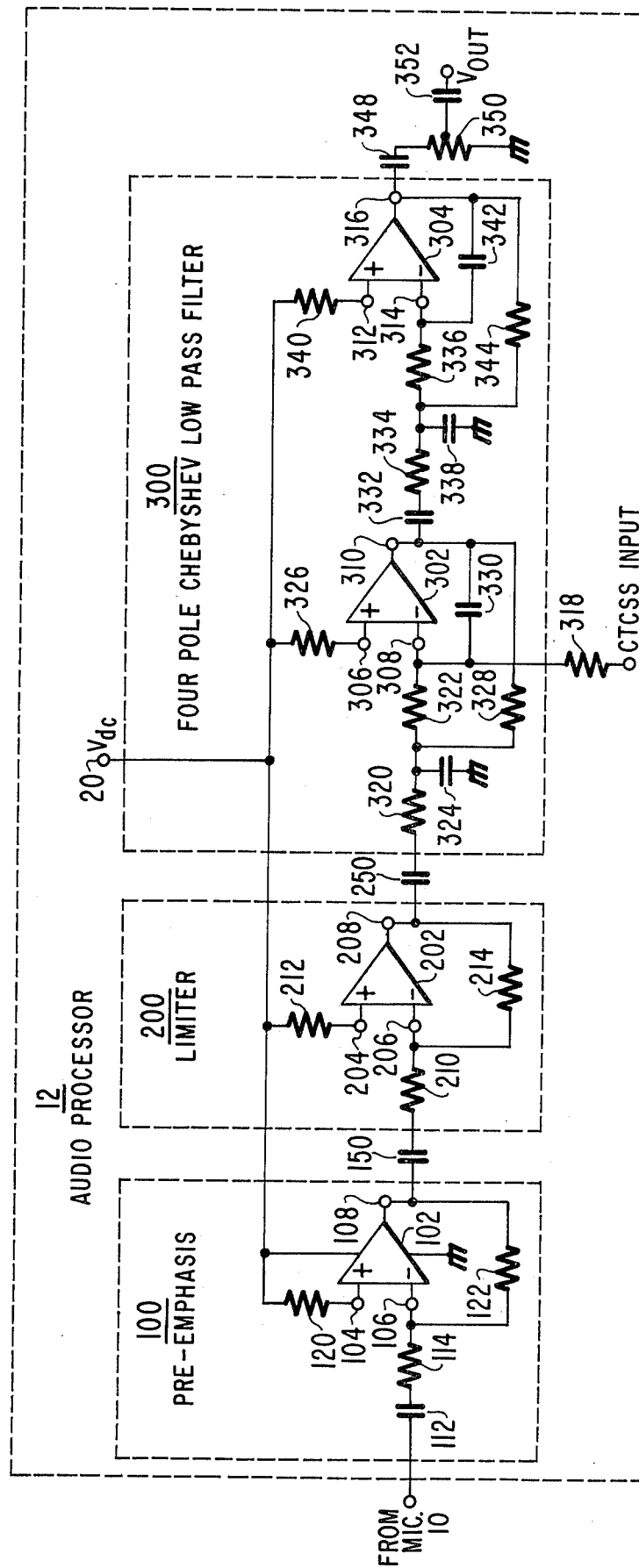
FIG. 3 is a schematic diagram of an audio processor in accordance with the present invention.

Referring to FIG. 3, an audio processor 12 embodying the various aspects of the present invention comprises a pre-emphasis network 100 including an operational amplifier 102; a limiter network 200 including an operational amplifier 202; and a four-pole active low pass filter 300 including operational amplifiers 302 and 304; all utilizing a positive voltage source 20.

Figure 4:
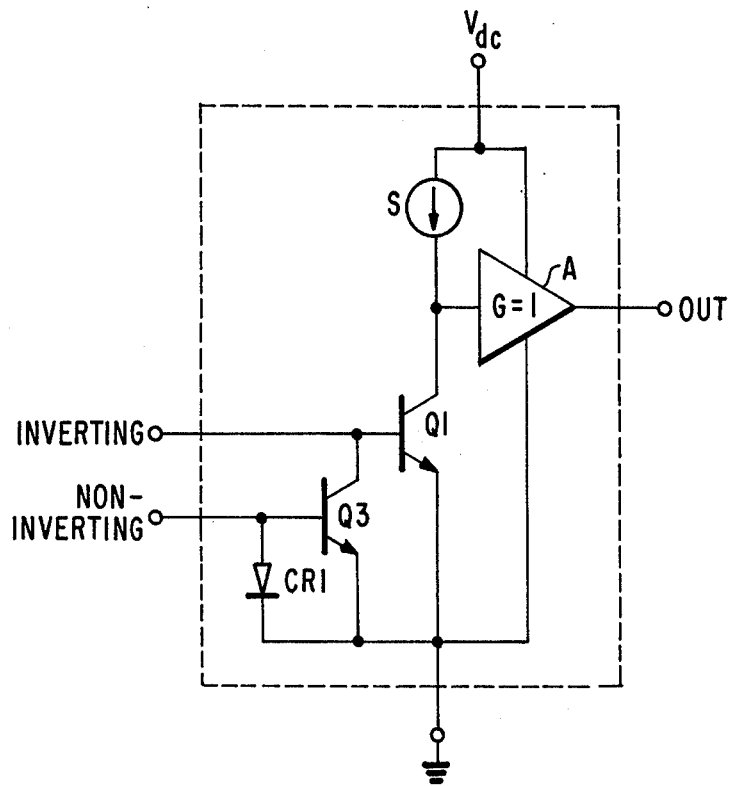
FIG. 4 is a simplified schematic diagram of an "op amp quad" used in the audio processor of FIG. 3.

Amplifiers 102, 202, 302, and 304 each comprise an operational amplifier of "transresistance" or "Norton" type. These amplifiers may be constructed on a single monolithic integrated circuit in a so-called "quad op amp" format. Suitable commercially available op-amp quads are the RCA CA 3401, the National Semiconductor LM 3900, and the Motorola MC3401P. Such chips typically utilize a single positive power supply (20) having a voltage of between 5 and 18 volts d.c., and are operable over a temperature range of −40° C to 85° C. The gain of such amplifiers should be sufficient at the upper frequencies of the audio input pass band to allow for large negative feedback. Each respective amplifier 102, 202, 302, and 304 typically has an open loop gain of 60 db or more and a unity gain bandwidth of 6 MHz. For a detailed schematic of such op amp quads reference is made to the data sheets on the above named commercial chips. A simplified schematic of a typical one of the operational amplifiers is shown in FIG. 4. A diode CR1 and an NPN transistor $Q_3$ are connected as a current mirror amplifier with minus unity current gain. The current mirror differentially combines current applied to the noninverting input terminal with the current applied to the inverting input terminal to develop a difference current applied as base current to a transistor $Q_1$. Transistor $Q_1$ is connected in a high-gain common-emitter amplifier configuration with a high impedance collector load being provided by a constant current generator S. A potential amplifier A having a voltage gain G substantially equal to unity connects the collector of $Q_1$ to output terminal OUT, providing for low output impedance and buffering the collector electrode of $Q_3$ from the load connected to the output terminal OUT.

Monolithic construction is particularly advantageous in that the limiting, gain, and distortion characteristics of audio processor 12 are unaffected by large temperature excursions since the components of the differential input circuits of the amplifiers have identical intrinsic parameters and will track each other in accordance with the temperature variation. Further, the high gain of these amplifiers allows for large negative feedback to reduce distortion and make the audio processor gain and limiting characteristic insensitive to integrated circuit parameter variance and component tolerances.

Referring again to FIG. 3, resistors 114, 120, 122, 210, 212, 214, 318, 320, 322, 326, 328, 334, 336, 340, 344, and potentiometer 350 discussed infra, are respectively of values denoted herein as $R_2$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$. Capacitors 112, 150, 250, 324, 330, 332, 338, 342, 348, and 352, also discussed infra, are respectively of values denoted herein as $C_1$, $C_3$, $C_4$, $C_5$, $C_6$, $C_7$, $C_8$, $C_9$, $C_{11}$, and $C_{12}$.

An audio signal processor 12 has been built for a mobile radio, the maximum allowable frequency deviation being 5 kHz and audio passband 300 to 3000 Hz, utilizing a 9.5 volt source and the component values set out in Table I.

TABLE I

| Component Value | Tolerance | Component Value | Tolerance |
|---|---|---|---|
| $R_2 = 1$ KΩ, | 5% | $C_1 = .01$ μF Mylar, | 2% |
| $R_4 = 121$ KΩ, | 1% | $C_3 = 33$ μF Tantalum | 20% |
| $R_5 = 24$ KΩ, | 5% | $C_4 = 33$ μF Tantalum | 20% |
| $R_6 = 1$ KΩ, | 5% | $C_5 = .02$ μF Mylar, | 2% |
| $R_7 = 39$ KΩ, | 1% | $C_6 = 4700$ pF Mylar, | 2% |
| $R_8 = 15$ KΩ, | 10% | $C_7 = 33$ μF Tantalum | 20% |
| $R_9 = 15$ KΩ, | 5% | $C_8 = .05$ μF Mylar, | 2% |
| $R_{10} = 9090$ Ω, | 1% | $C_9 = 680$ pF Mica | 2% |
| $R_{11} = 9090$ Ω, | 1% | $C_{11} = 33$ μF, Tantalum | 20% |
| $R_{12} = 39$ KΩ, | 1% | $C_{12} = 33$ μF, Tantalum | 20% |
| $R_{13} = 9090$ Ω, | 1% | | |
| $R_{14} = 9090$ Ω, | 1% | | |
| $R_{15} = 9090$ Ω, | 1% | | |

TABLE I-continued

| Component Value | Tolerance | Component Value | Tolerance |
|---|---|---|---|
| $R_{16} = 39$ KΩ, | 1% | | |
| $R_{17} = 9090$ Ω, | 1% | | |
| $R_{18} = 10$KΩ POT. | 30% | | |

Pre-emphasis network 100 operates to provide attenuation of the audio signal in accordance with a predetermined function. The attenuation of pre-emphasis network 100 decreases as frequency of the audio signal increases, to compensate for the noise characteristic of an FM system which increases in the direction of higher audio frequencies. The prescribed pre-emphasis network attenuation characteristic (transfer function) for mobile radio decreases from 300 Hz to 3000 Hz at a nominal rate of 6 db per octave. Consequently, higher frequency components in the audio signal result in a greater deviation than do lower frequency components having the same amplitude (below the clipping level). The overall frequency response of the FM system is restored to a linear relation by the use of a de-emphasis network in the receiver having an attenuation characteristic generally equal to, but opposite that of the pre-emphasis network 100.

The transfer function of the pre-emphasis network is generally expressed as:

$$\frac{V_{IN}}{V_{OUT}} = \sqrt{1 + \frac{f_p}{f}}$$

where $f_p$ is the cut-off frequency of the pre-emphasis network and $f$ is the frequency of the particular component of the audio signal, $V_{IN}$ is RMS voltage of the pre-emphasis network.

Pre-emphasis networks typically comprise a resistive-capacitive network, such as a serially connected capacitor and resistor, having a predetermined time constant, which determined the cut-off frequency of the network. The attenuation characteristic of a pre-emphasis network is preferably linear across the entire prescribed audio passband. However, in prior art designs the transfer function cut-off frequency of typical pre-emphasis networks has been chosen to be approximately equal to the upper limit of the audio input passband, resulting in deviations from the ideal characteristic of 6 db per octave at the high end of the audio input passband.

Pre-emphasis network 100 differs from those used in the prior art in that its transfer function is caused to have a cut-off frequency much higher, for example, by a factor of 5, than the upper limit of the audio input passband. This higher cut-off frequency is so chosen that all substantial non-linearities occur at frequencies above the prescribed audio input passband. The pre-emphasis network attenuation characteristic is thus substantially linear at a rate of 6 db per octave across the entire audio input passband. Amplifier 102 provides sufficient voltage gain to offset the additional attenuation of pre-emphasis network 100 due to the higher cut-off frequency. Operational amplifier 102 has a non-inverting input terminal 104, an inverting input terminal 106, and an output terminal 108. Feedback resistor 122, (of resistance $R_5$) is connected between output terminal 108 and inverting input terminal 106, to which terminal 106 an output resistor 114 (having a resistance $R_2$) also connects. The voltage gain $G_1$ of the feedback amplifier so formed, as between the end of resistor 114 remote from terminal 106 and the output terminal 108, is defined in terms of $R_2$ and $R_5$ as follows:

$$G_1 = (R_5/R_2) \qquad (1)$$

$G_1$ is carefully chosen in the preferred embodiment of FIG. 3 as will be explained infra. The input impedance of the feedback amplifier is resistive in nature and has a value substantially equal to $R_{IN}$, defined as follows:

$$R_{IN} = R_2 + R_{INV} \qquad (2)$$

where $R_{INV}$ is the real part of the input impedance of amplifier 102 (about 100 ohms when using the CA3041, LM3900 or MC3401 quad amplifiers).

The MICROPHONE OUTPUT terminal receives input audio signals from a preceding microphone amplifier, not shown, for pre-emphasis. Pre-emphasis is carried out by the high-pass filter action of a capacitor 112, linking the MICROPHONE OUTPUT terminal to the end of resistor 114 at the input of the feedback amplifier, in series with the input resistance $R_{IN}$ of the feedback amplifier. Amplifier 102 in effect provides a virtual short-circuit input impedance for this series network and responds to the current flow therein to provide an output voltage proportional to such current flow.

The overall transfer function of pre-emphasis network 100 may be expressed as:

$$\frac{V_{OUT}}{V_{IN}} = \frac{R_5}{R_2 \sqrt{1 + (\frac{fp}{f})^2}} \qquad (3)$$

$$\text{where: } fp = \frac{1}{2\pi (R_2 + R_{INV}) C_1} \qquad (4)$$

$C_1$ is the capacitance of capacitor 112 and $f$ is the frequency of the audio input signal component.

Resistor 120, coupled between power supply 20 and non-inverting input terminal 104, operates to establish the quiescent output voltage level of amplifier 102 and further to establish a maximum hum and noise level generated by amplifier 102. As will be more fully discussed in conjunction with the description of limiter 200 the threshold clipping level and quiescent voltage level of amplifier 102 are respectively established by power supply 20 voltage Vdc and the ratio of the value $R_4$ of resistor 120 and the value $R_5$ of feedback resistor 122. The ratio of resistances of biasing resistor 120 and feedback resistor 122, 100 are chosen for optimum noise characteristics rather than for clipping symmetry. Thus, it is desirable to prevent clipping of signals by pre-emphasis network 100 in that such unsymmetrical clipping would give rise to distortion. Pre-emphasis network 100 is therefore designed to avoid clipping for the range of expected microphone output signals. To meet these requirements, the resistance $R_4$ of resistor 120 is chosen larger than the resistance $R_7$ of resistor 212, and the gain $G_1$ is chosen in accordance with the following equation:

$$G_1 = \frac{(V_{dc} - 1) \Delta F_{ST} \sqrt{(1) + (\frac{fp}{fR})^2}}{\sqrt{8} \; G_2 \Delta F_{max} V_{IN-60}} \qquad (5)$$

where $V_{dc}$ is the value of voltage source 20, $\Delta F_{max}$ is the maximum allowable deviation of the system, fR is the standard reference frequency, $\Delta F_{ST}$ is the standard frequency deviation (set by industry standard, 60%, of $\Delta F_{max}$ by EIA), $V_{IN-60}$ is the input voltage required to obtain 60% deviation (set by industry standard) and $G_2$ is the gain of limiter 200.

$G_1$ is calculated to be equal to 24 for a mobile radio in which full clipping and limiting is set in accordance with the above described EIA standard procedure; in which the gain $G_2$ of limiter 200 is equal to 15, as will be explained; in which the input voltage $V_{IN}$ required to obtain 60% frequency deviation is 0.075 VRMS; and in which power supply 20 supplies a 9.5 d.c. operating voltage.

Limiter 200, as noted above, operates to limit the amplitude of the audio signals passed onto the FM modulator 14 to a predetermined amplitude, termed the clipping level. Limiter 200 further supplies sufficient gain to audio processor 12 such that the maximum frequency deviation ($\Delta F_{max}$) can be attained with a modulator of a given sensitivity in response to a predetermined audio signal amplitude (typically set by industry standard) generated by microphone 10 and such that at the same time clipping can be avoided in pre-emphasis network 100 for expected microphone output levels. A voltage dividing potentiometer 350, subsequently adjusts maximum amplitude output signal of audio processor 12 to correspond to the maximum deviation. Briefly, limiter 200 operates as an amplifier with respect to input signals having amplitudes between a predetermined upper threshold level and below a predetermined lower threshold level, but provides a symmetrically clipped response to all signals above or below the respective threshold levels. Limiter 200 comprises operational amplifier 202, as noted supra; a feedback resistor 214 connecting the output terminal 208 of amplifier 202 to its inverting input terminal 206, an input resistor 210, and a biasing resistor 212. Input resistor 210 is in series connection with a coupling capacitor 150 between output terminal 108 of operational amplifier 102 in the preceding pre-emphasis network and the inverting terminal 206 of operational amplifier 202 in limiter 200. Biasing resistor 212 connects terminal 20, to which operating voltage $V_{dc}$ is applied, to non-inverting terminal 204 of operational amplifier 202.

The maximum and minimum limiter (200) output signal amplitudes are established by the positive supply voltage $V_{dc}$ and the ground potential. Symmetrical clipping is obtained by maintaining a quiescent output voltage at midway between $V_{dc}$ and ground. The signal level produced at pre-emphasis network output terminal 108 at or above which the peak-to-peak signal at limiter output terminal 208 is driven over substantially the entire supply range is therefore approximately equal to $V_{dc}$ divided by the limiter gain $G_2$. With reference to FIGS. 3 and 4, the connection of resistor 212 ($R_7$) between power supply 20 ($V_{dc}$) and non-inverting input terminal 204, establishes a current flowing into terminal 204. Essentially, all of this current flows through diode CR1, (FIG. 4) and is therefore, in accordance with Ohm's Law, of a level equal to $V_{dc}$ minus the voltage drop (0.55 to 0.7 volt) across diode CR1, all divided by $R_7$. A relatively low level base current maintains transistor $Q_1$ in its normal operating region, wherein its base-emitter voltage ($V_{be}$) is in the range of 0.55 to 0.7 volts. Resistance $R_7$ and voltage $V_{dc}$ are chosen to generate a current level much larger than the requisit base current of transistor $Q_1$. Feedback resistor 214, connected between output terminal 208 and inverting input terminal 206 must then supply a current of substantially the same value as the current through diode CR1, in order to maintain the base current of transistor $Q_1$ within the normal operating range. The level of current through feedback resistor 214 is, in accordance with Ohm's Law, equal to the limiter output voltage $V_{OUT}$ minus the base-emitter voltage drop of $Q_1$, all divided by the resistance $R_8$ of resistor 214. By choosing resistances $R_7$ and $R_8$ in substantially 2:1 ratio the feedback connection defines a quiescent value of $V_{OUT}$, that is, approximately one half of $V_{dc}$. This ratio of quiescent output voltage versus $V_{dc}$ is substantially constant despite variation of $V_{dc}$, so long as $V_{dc}$ is substantially larger than the offset potentials at the input terminals 204, 206 of the amplifier 202. Limiting in amplifier 202 is effected by power supply constraints in that there is capability for output signal swing downward only to within 550 mv or so of ground and upward only to within 550 mv or so of $V_{dc}$. Thus, if the 2:1 ratio of $R_7$ to $R_8$ is maintained symmetry of limiting will be obtained. This symmetry is due to feedback and is substantially unaffected by changes in amplifier 202 so long as its open loop gain is much larger than $G_2$.

The gain of limiter 200 is established by the respective values $R_6$ and $R_8$ of the input and feedback resistors 210 and 214. Inverting input terminal 206 is a virtual ground with respect to ac signals in that the feedback connection causes a substantially constant base-emitter offset potential to be exhibited at terminal 206. Thus, to accord with Ohms Law, the current flowing through input resistor 210 must be equal in magnitude but of opposite sense to the current flowing through feedback resistor 214. The voltage gain $G_2$ of limiter 200, at levels below clipping is therefore equal to the ratio of resistances $R_8$ and $R_6$, that is $$G_2 = R_8/R_6 \tag{6}$$

The limiter gain $G_2$ is chosen such that limiting occurred in response to audio input signals from microphone 10 (FIG. 1) having a predetermined amplitude level, such level being set by industry standard. More specifically, $G_2$ is chosen to have a value equal or slightly exceeding $G_2$ min, as defined by the following formula to apportion the total required audio processor gain between pre-emphasis network 100 and limiter 200, and to avoid the occurrence of limiting in pre-emphasis network 10 at lower microphone output levels than necessary to cause limiting in limiter 200.

$$G_{2_{min}} = \frac{\sqrt{1 + (\frac{f_p}{f_{lm}})^2} \, \Delta F_{MAX}}{\sqrt{1 + (\frac{f_p}{f_R})^2} \, \Delta F_{ST} K_{LM}} \tag{7}$$

where $f_{LM}$ is the lower limit of the audio input passband, $f_R$ is the standard reference frequency, and $K_{LM}$ is the inverse of the ratio between the peak amplitude of a signal at $f_{LM}$ were it not limited, to its peak amplitude as limited. For mobile radio applications, although a clipping ratio $K_{LM}$ of one is the minimum required, optimization for clipping symmetry at the lowest audio transmitted frequency resulted in the choice of a clipping ratio of 0.037 for the circuit described. Therefore, the gain $G_2$ of the amplifier 202 is set to the value of $G_{2MIN}$ with the clipping ratio at the lowest audio frequency $K_{LM}$ equal to 0.37.

Prior art signal processors have typically used diode clipping circuits to perform the amplitude limiting function. Such diode circuits, however, are disadvantageous as compared to limiter 200 in that the diode resistance is highly non-linear at amplitudes just under the clipping threshold, introducing distortion to the signal prior to limiting. In addition, the diodes are not temperature-matched, and accordingly, the clipping level of the diode circuits typically vary with temperature.

Limiter 200 provides symmetrical limiting for a 20-30 db range of input signals, without threshold voltage shift problems characteristic of prior art limiters.

As can be seen from a Fourier Analysis of a clipped or limited signal, the operation of limiter 200 generates harmonic signal components having frequencies outside of the audio passband (300 to 3,000 Hz) which appear, together with desired audio components, at terminal 208. This limiter output signal is applied via coupling capacitor 250 to the input terminal of low pass filter 300 which operates to pass the desired audio components, but to attenuate such spurious out-of-band signal components. Low pass filter 300 is a four-pole low pass active filter having a Chebyshev type response, with a 0.5 db ripple and a transmission peak (zero) in the vicinity of the standard reference frequency (1,000 Hz).

As noted above, low-pass filter 300 utilizes two operational amplifiers 302 and 304. Operational amplifier 302 has a non-inverting input terminal 306, an inverting input terminal 308 and an output terminal 310. Operational amplifier 304 similarly has a non-inverting input terminal 312, an inverting input terminal 314, and an output terminal 316. A Continuous Tone Coded Squelch System (CTCSS) signal utilized in the receiver to prevent production of an audio signal in the absence of an actual transmission, typically a sine wave in the frequency range of 67 to 250 Hz, may be applied through an isolation resistor 318, directly to inverting input terminal 308 of amplifier 302. Resistors 320 and 322 follow coupling capacitor 250 in a serial connection between terminal 208 and inverting input terminal 308. A capacitor 324 is connected between the juncture of resistors 320 and 322 to ground. A resistor 326 is connected between voltage supply 20 and non-inverting input terminal 306. A resistor 328 is fed back from output terminal 310 to the juncture between resistors 320 and 322. In addition, a capacitor 330, is connected between output terminal 310 and inverting input terminal 308. Output terminal 310 is connected through a coupling capacitor 332 and serially connected resistors 334 and 336 to inverting input terminal 314 of amplifier 304. A capacitor 338 connects the juncture of resistors 334 and 336 to ground. A resistor 340 is connected between power supply 20 and non-inverting input terminal 312 of amplifier 304. A capacitor 342 is connected between output terminal 316 and inverting input terminal 314 and a resistor 344, coupled between output terminal 316 and the juncture between resistors 334 and 336. An RF bypass capacitor (not shown) may be coupled across power supply 20 to ground. Output terminal 316 of amplifier 304 is serially connected through a coupling capacitor 348 and a potentiometer 350 to ground. The output signals from potentiometer 350 are coupled through a capacitor 352 to FM modulator 14 (FIG. 1). The output signals of potentiometer 350 may ultimately be coupled to a plurality of FM modulators.

Figure 5:
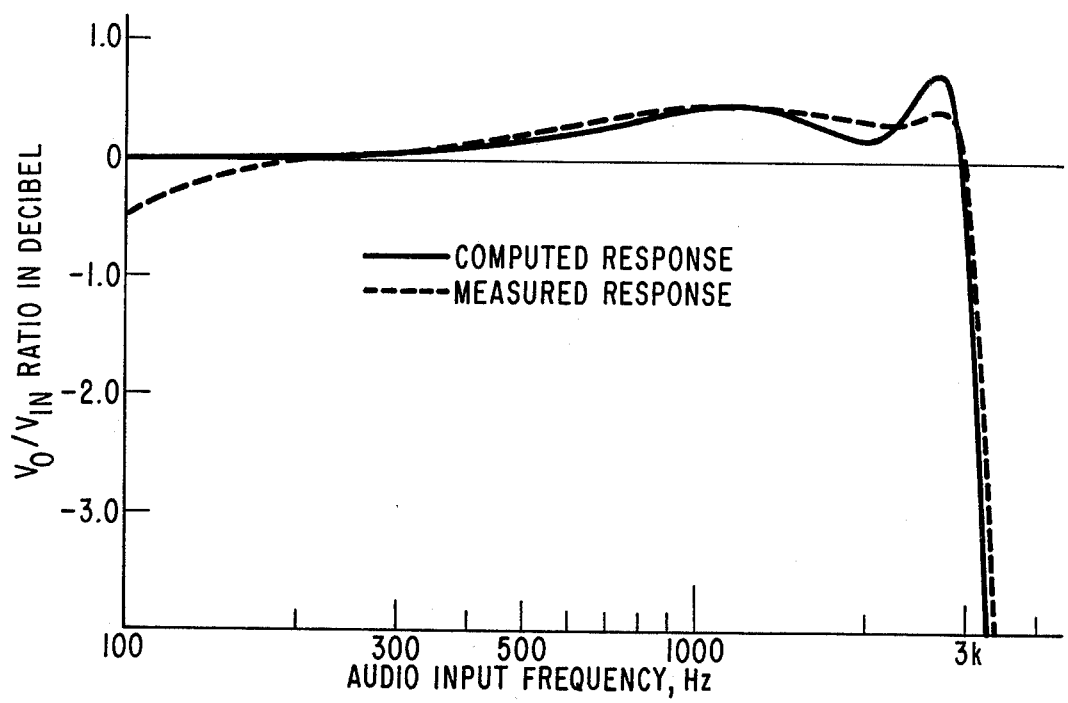
FIG. 5 is a plot of the response of the low pass filter of FIG. 3.

Amplifier 302 and associated circuit elements 320 through 330 comprise a first resonator and amplifier 304 and associated circuit elements 334 through 344 constitute a second resonator, respectively generating first and second complex conjugate pole pair. For the value of components set out in Table I, the first resonator (associated with amplifier 302) generates a complex conjugate pole pair with normalized location (with respect to unity bandwidth) at $-0.4233398 \pm j0.4209457$, and has a Q equal to 0.705111. The second resonator (associated with amplifier 304) generates a similar conjugate pole pair with normalized locations at $-0.1753531 \pm j1.0162529$, and has a Q equal to 2.9405. Consequently, the overall filter characteristic is a four-pole Chebyshev $\pm$ 0.5 db ripple type characteristic, having response transmission peaks around 1180 and 2700 Hz. Calculated and measured frequency response for such a filter are illustrated in FIG. 5. The difference between the calculated and measured frequency responses are primarily due to losses in amplifiers 302 and 304 while the synthesis of the filter elements assumed ideal amplifiers and the finite values of coupling capacitors 150, 250, 332, and 348 determine the fall-off below 300 Hz. It should be appreciated that the reduction of the secondary peak of in the vicinity of 2700 Hz in the measured response as compared to the calculated response substantially eliminates the possibility of over-modulation that might have been expected from the calculated response.

The limiting characteristic response of a transmitter utilizing an audio processor 12 with component values as per Table I is shown in FIG. 2, generally indicated as 360. It should be noted that the frequency deviation v. audio input frequency is essentially constant so long as the input amplitude level is greater or equal to the limiting level at the lowest audio frequency. Thus, setting the transmitter modulator such that the frequency deviation is equal to the maximum allowable deviation (5 kHz) with an input signal at the standard reference frequency (1,000 Hz) at the limiting level, ensures that no over-modulation will occur at any of the frequencies within the audio input passband.

In some instances, a higher hum and noise signal-to-noise ratio is desirable in limiting. A transmitter having an improved hum and noise signal-to-noise ratio and, in addition, having less distortion due to limiting, may be achieved by exchanging the values of capacitors 324 and 338 and capacitors 330 and 342, in effect reversing the order of the first and second resonators. The limiting characteristic response of such a transmitter is indicated in FIG. 2 as response 370. It should be noted, that as with limiting characteristic response 360, response 370 is essentially flat, insuring thereby that setting the sensitivity of the FM modulator with a limiting level signal at the standard reference frequency (1,000 Hz), will not result in over modulation at other frequencies within the audio frequency passband. It should further be noted, that the cut-off frequency of the response changes in accordance with the amplitude of the input signal due to the limiting characteristic of amplifier 302 when the input signal thereto exceeds the clipping level. The clipping level is proportional to the amplitude of the signal applied to inverting input terminal 308, and reaches a peak value at the frequency of the pole of the second resonator, in the vicinity of 2700 Hz. Thus, limiting is more severe at such frequencies, in effect damping the second resonator pole Q, and narrowing the bandwidth of the filter proportionally to the input voltage. The larger attenuation of the Fourier components of the amplitude limited signal provides for lower distortion in the audio signal recovered by the receiver.

In addition, the hum and noise signal to noise ratio is improved, by an average of 4 or 5 db, in limiting because of the lower bandwidth of the filter, and consequent lower noise bandwidth of such a configuration, and below limiting because, in general, there is an overall noise figure improvement where a high Q pole preceeds a lower Q pole in a four-pole filter.

It should be appreciated from the foregoing description that the present invention provides a particularly advantageous audio processor. Pre-emphasis network 100 provides for an attenuation characteristic approaching the ideal linear 6 db octave characteristic. Limiter 200 provides for symmetrical clipping in response to input signal upper and lower levels independent of temperature and parameter variance since both the inverting and non-inverting input terminal bias voltages are provided by a common source, and stability is insured by high negative feedback. Filter 300 provides a limiting characteristic response with a transmission plateau at the standard reference frequency to ensure that no over-modulation occurs at any frequency within the audio input passband. Further, since inverting input terminal 308 is a virtual AC ground, a high degree of isolation, for example 60 db, exists between the CTCSS signal and the audio input signals. In addition, optimum temperature compensation can be achieved by forming all of the amplifiers on a common substrate.

What is claimed is:

1. In an audio processor for use in a direct frequency modulation system responsive to an input signal having components at a plurality of frequencies within a predetermined band of audio frequencies, said audio processor being of the type including preemphasis means, responsive to said input signal, for shaping the magnitude of preselected ones of said input signal frequency components in accordance with a predetermined transfer function, said transfer function having a predetermined upper cut off frequency of preemphasis; limiting means, responsive to said shaped audio signal for limiting the maximum voltage swing of said shaped audio signal; and filter means, responsive to said limited signal for attenuating components of said limited signal having frequencies outside of a predetermined range of frequencies; the improvement wherein;

said preemphasis means comprises a shaping network having a transfer function with an upper cut off frequency of preemphasis above the highest frequency of said predetermined band of audio frequencies to provide an attenuation characteristic that decreases substantially at a constant logarithmic rate with increasing frequency across said predetermined audio frequency band, said limiting means including a Norton type of operational amplifier characterized by inventing and non-inverting current responsive inputs biased by a single source using the current mirror type operation and by the collector load of a difference current amplifier being a constant current source, said operational amplifier having a value of feedback resistance and bias resistance selected to provide symmetrical clipping, said filter means being a Chebychev type filter having a generally equal amplitude but ripple response over said predetermined band with a steep slope cut off with one of the response peaks being located near the highest frequency of said predetermined band.

2. The combination of claim 1 wherein said Chebychev filter comprises operational amplifiers of the Norton type connected in cascade and adapted to produce a four-pole Chebychev response.

3. The combination of claim 1 wherein said biasing resistance and said feedback resistance of said limiting means are of relatively low value to improve the limiting characteristics.

4. The combination of claim 1 wherein said upper cut off frequency of said preemphasis is many times higher then the highest frequency of said predetermined band.

5. The combination of claim 4 wherein said upper cut off frequency of preempasis is about five times higher than the highest frequency of said predetermined band.

6. The combination of claim 5 wherein said preemphasis includes a Norton type operational amplifier, said filter means includes Norton type operational amplifiers wherein all of said Norton type operational amplifiers are formed on a common substrate utilizing a common power supply.

* * * * *

UNITED STATES PATENT AND TRADEMARK OFFICE
CERTIFICATE OF CORRECTION

PATENT NO. : 4,110,692

DATED : August 29, 1978

INVENTOR(S) : BORTOLO MARIO PRADAL

It is certified that error appears in the above-identified patent and that said Letters Patent is hereby corrected as shown below:

Column 4, line 30, that portion reading $"\frac{V_{IN}}{V_{OUT}} = \sqrt{1 + \frac{f_p}{f}}"$ should read -- $\frac{V_{IN}}{V_{OUT}} = \sqrt{1 + \frac{f_p^2}{f}}$ --; Column 6, line 1, that portion reading ", 60%," should read -- , 60% --; Column 7, line 65, that portion reading "0.037" should read -- .37 --; Column 10, line 55, that portion reading "inventing" should read -- inverting --;

Signed and Sealed this

Twenty-seventh Day of March 1979

[SEAL]

Attest:

RUTH C. MASON
Attesting Officer

DONALD W. BANNER
Commissioner of Patents and Trademarks